May 10, 1966      D. COLEMAN      3,251,020
PROTECTIVE BOOT FOR ELECTRICAL CONNECTIONS
Filed May 5, 1964
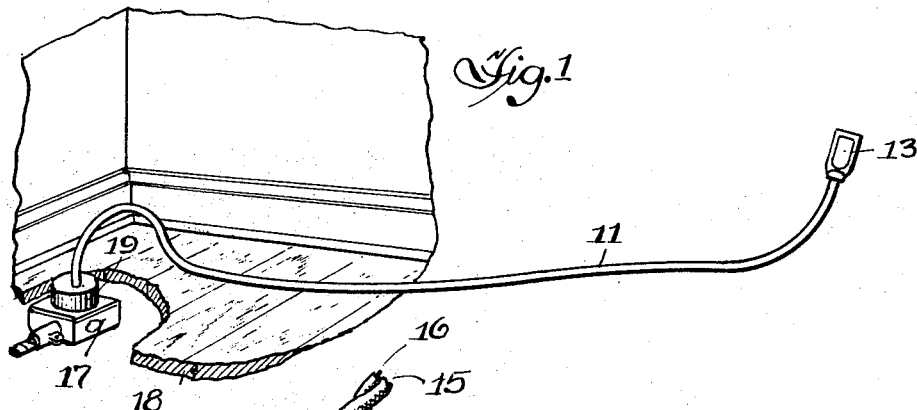
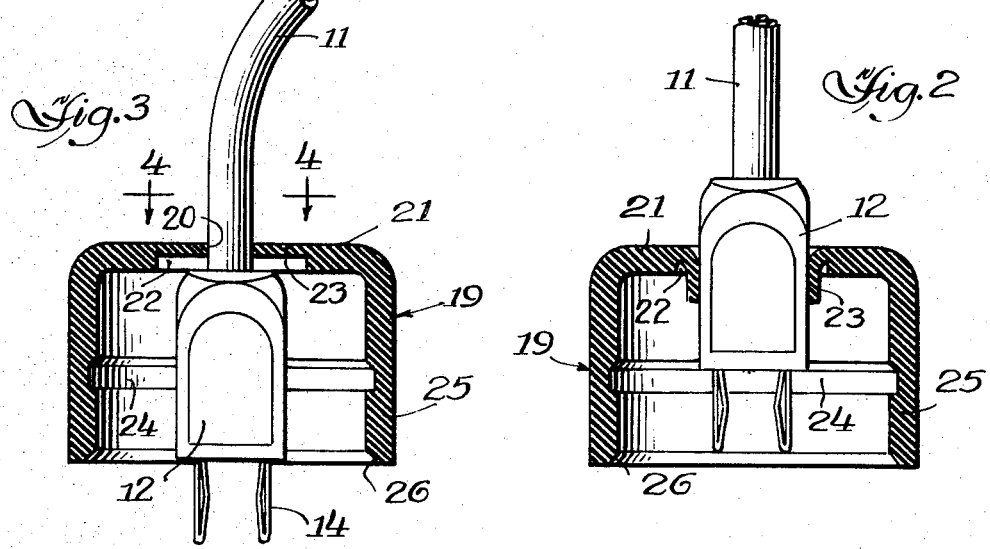
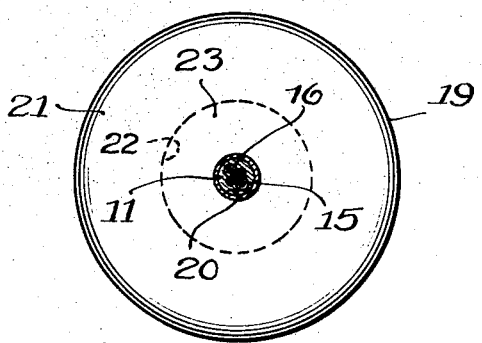
Inventor,
David Coleman,
By: Benjamin Schlosser

United States Patent Office 3,251,020
Patented May 10, 1966

3,251,020
PROTECTIVE BOOT FOR ELECTRICAL
CONNECTIONS
David Coleman, Oak Park, Ill., assignor to Coleman
Cable & Wire Company, River Grove, Ill., a corporation of Delaware
Filed May 5, 1964, Ser. No. 364,955
4 Claims. (Cl. 339—94)

This invention relates to a protective boot for electrical connections, and is particularly concerned with means for minimizing the possibility of short circuits in electrical connections just below floor level.

Electrical connections below floor level are often used in offices, laboratories and factories for connecting various electrically operated machines, equipment and apparatus to a current source. The connecting wire has one end permanently secured to the machine, equipment or apparatus, and a socket adapted to be plugged into an electrical outlet is secured to the other end of the connecting wire. Many of these connections are left indefinitely, with the electrical cord extending from any electrically operated device through an opening in the floor, and with the plug on one end of the wire plugged into a socket housed in an outlet box mounted just below an aperture in the floor. Electrical connections of this type have long been susceptible to short circuits because water from ordinary cleaning operations drips through the aperture in the floor and wets the wires or contacts.

In order to protect the electrical connections from water, it has been customary to cover them with a boot made of rubber, plastic or any suitable elastomer type of material. Such boots are molded in the shape of an inverted cup having a top wall and a cylindrical side wall depending therefrom. The top wall is imperforate except for an aperture having a diameter approximately equal to the diameter of the electrical cord that passes therethrough. The boot is made comparatively thick in order to provide a durable structure that will not deteriorate rapidly in use. The thickness of the top wall also prevents lateral deformation thereof.

When the above-described protective boots were first used they offered adequate protection against short circuits, and were approved by Underwriter's Laboratories, At that time the plug was secured to the end of an electrical cord by means of screws. It was a simple matter to remove the plug from one end of the cord, pass the cord through the aperture and then secure the plug to the end of the cord again. After the plug was connected to the socket, the boot was pushed down over the connection. The cord completely filled the aperture in the top wall of the boot so that no water could enter the boot, and adequate protection was provided against water that might otherwise drip or seep into the electrical connection and cause a short circuit.

The advent of electrical cords having plugs molded on the ends thereof spelled the end of the protection offered by the protective boots. With a plug permanently secured to one end of the cord, and the other end of the cord permanently secured to an office machine, or some other type of equipment or apparatus, or, in the case of an extension cord, to a socket, both ends of the cord were permanently secured to something larger in cross section than the aperture in the top wall of the protective boot. Since the plug could not be pushed through the aperture, it became common practice to slit the top wall of the boot to enlarge the aperture. The plug was then pushed through the enlarged aperture, and, after the plug was connected to the outlet, the boot was pushed down over the connection. Boots that were slit were not effective as a protection against short circuits because the slit in the top wall would not close completely, and water would seep through the crack in the top wall of the boot.

Various types of split closures or washers were used in attempts to provide a tight closure around the cord, but such devices proved to be unsatisfactory because the extra closure members often were knocked out of place and became lost.

In accoradnce with the present invention, the top of the boot is provided with an annular recess surrounding the aperture. The circumference of the recess is greater than the cross sectional perimeter of the plug secured to one end of the electrical cord. The side wall and the outer edge portions of the top of the boot are thick enough to provide the desirable durability for the boot. The recess may extend from either surface of the top, but preferably extends from the underside, because such construction leaves the top surface smooth, so that no water can collect on top of the boot and cause the boot to deteriorate. The recess leaves a centrally disposed portion of the top wall contiguous to the aperture thin enough to be very flexible. The centrally disposed portion of the top wall of the boot above the recess may be deformed laterally by the plug as the plug is pressed against the edges of the apertures. The plug and the end of the electrical cord can be pushed through the aperture which is spread by said deformation of the centrally disposed portion of the top wall of the boot. After the plug is passed through the aperture, the top wall of the boot returns automatically to its normal position, and the close fit of the aperture around the periphery of the electrical cord provides the protection for which the boot was originally designed.

The structure by means of which the above mentioned and other advantages of the invention are attained will be fully described in the following specification, taken in conjunction with the accompanying drawings showing a preferred embodiment of the invention, in which:

FIG. 1 is a perspective view showing an electrical extension cord having its plug end connected to a socket housed in an outlet mounted just below an aperture in the floor, with the electrical connection protected by a boot embodying the invention;

FIG. 2 is a vertical sectional view showing a plug as it is being pushed through the aperture in the top wall of the protective boot;

FIG. 3 is a vertical sectional view showing a protective boot positioned on one end of an electrical cord adjacent a plug secured to one end of the cord; and FIG. 4 is a cross sectional view, taken along the line 4—4 of FIG. 3.

In the drawings, a conventional electrical extension cord 11 is provided with a plug 12 at one end and a socket 13 at the other end. Each of these members is preferably made of plastic, but may be made of any suitable moldable material. The prongs 14 are connected to the wires 15 and 16 of the cord, and the plug is molded in place. The socket is also molded in place, and neither the plug nor the socket can be removed from the extension cord without destroying its usefulness. Although the drawings shown an extension cord, it will be understood that one end of the cord may be permanently secured to any electrically operated machine, equipment or apparatus instead of to a socket.

As shown in FIG. 1, the plug may be connected to a socket (not shown) housed in an outlet box 17 mounted just below floor level. The floor 18 is apertured in registration with the outlet box, and the aperture (not shown) is covered with any suitable closure member (not shown). The closure member may be opened or removed to permit entry of the plug. The cord extends through the aperture in the floor when the plug is connected to the socket, and therefore the aperture cannot be closed as long as the plug is connected to the socket. The electrical connection is often exposed to the damaging action of water that may drip through the aperture in the floor when the floor is mopped.

An inverted cup-shaped boot 19, made of rubber, plastic, or any suitable elastomer type of material is provided with a centrally disposed aperture 20 in its top wall 21. The aperture is dimensioned to fit snugly around the periphery of the electrical cord, and is therefore substantially smaller in area than the cross section of the plug secured to one end of the cord. The durability required for the boot to provide satisfactory commercial use necessitates such thickness for the boot that the aperture 20 cannot stretch enough to permit the plug to pass through the aperture.

The underside of top wall 21 is provided with an annular recess 22 surrounding the aperture 20. The centrally disposed portion 23 of the top wall above the recess is thin enough to provide sufficient flexibility contiguous to the aperture to allow lateral deformation of the centrally disposed portion of the top wall of the boot. The surface area of this thin flexible portion of the top wall of the boot is greater than the cross sectional area of the plug, and the aperture may be spread for passage of the plug. After the plug is pushed through the enlarged aperture, the centrally disposed portion 23 of the top wall returns to its normal position and fits snugly around the periphery of the cord 11 to provide the electrical connection with the desired protection against water that may drip through the aperture in the floor.

The boot is preferably provided with an integral circumferential groove 24 to provide more flexibility to the cylindrical side wall 25 of the boot in case the aperture in the floor, through which the boot must be pushed, is relatively small. The lower edge of the side wall 25 is preferably beveled, as indicated at 26, to facilitate fitting the bottom of the boot against the top surface of the outlet box.

Although I have described a preferred embodiment of the invention in considerable detail, it will be understood that the description thereof is intended to be illustrative, rather than restrictive, as many details of structure may be modified or changed without departing from the spirit or scope of the invention. Accordingly, I do not desire to be restricted to the exact details disclosed.

I claim:

1. A waterproof inverted cup-shaped boot of elastic material for protecting an electrical connection consisting of an electrical plug secured to one end of an electrical cord and plugged into a socket, said boot comprising a top wall and a cylindrical side wall depending therefrom, each of said walls having a thickness sufficient to prevent lateral deformation thereof, said boot being adapted to substantially enclose said plug with said cylindrical wall surrounding said plug, said top wall having an aperture adapted to fit snugly around the periphery of said cord, and a recess in said top wall contiguous to said aperture for increasing the elasticity of the portion of said top wall contiguous to said aperture, whereby said portion of said top wall may be temporarily deformed laterally to permit said plug to pass through said aperture and will automatically return to its normal position to fit snugly around the periphery of said cord after said plug has been passed through said aperture.

2. A waterproof inverted cup-shaped boot of elastic material for protecting an electrical connection consisting of an electrical plug secured to one end of an electrical cord and plugged into a socket, said boot comprising a top wall and a cylindrical side wall depending therefrom, each of said walls having a thickness sufficient to prevent lateral deformation thereof, said boot being adapted to substantially enclose said plug with said cylindrical wall surrounding said plug, said top wall having an aperture adapted to fit snugly around the periphery of said cord, and a recess in said top wall contiguous to said aperture increasing the elasticity of the portion of said top wall contiguous to said aperture, said recess having a circumference larger than the cross sectional perimeter of said plug, whereby the portion of said top wall contiguous to said aperture may be temporarily deformed laterally to permit said plug to pass through said aperture and will automatically return to its normal position to fit snugly around the periphery of said cord after said plug has passed through said aperture.

3. A waterproof inverted cup-shaped boot of elastic material for protecting an electrical connection consisting of an electrical plug secured to one end of an electrical cord and plugged into a socket, said boot comprising a top wall and a cylindrical side wall depending therefrom, each of said walls having a thickness sufficient to prevent lateral deformation thereof, said boot being adapted to substantially enclose said plug with said cylindrical wall surrounding said plug, said top wall having an aperture adapted to fit snugly around the periphery of said cord, and an annular recess on the underside of said top wall contiguous to said aperture increasing the elasticity of the portion of said top wall contiguous to said aperture, whereby the portion of said top wall contiguous to said aperture may be temporarily deformed laterally to permit said plug to pass through said aperture and will automatically return to its normal position to fit snugly around the periphery of said cord after said plug has passed through said aperture.

4. A waterproof inverted cup-shaped boot of elastic material for protecting an electrical connection consisting of an electrical plug secured to one end of an electrical cord and plugged into a socket, said boot comprising a top wall and a cylindrical side wall depending therefrom, each of said walls having a thickness sufficient to prevent lateral deformation thereof, said boot being adapted to substantially enclose said plug with said cylindrical wall surrounding said plug, said top wall having an aperture adapted to fit snugly around the periphery of said cord, and an annular recess on the underside of said top wall contiguous to said aperture increasing the elasticity of the portion of said top wall contiguous to said aperture, said recess having a circumference larger than the cross sectional perimeter of said plug, whereby the portion of said top wall contiguous to said aperture may be temporarily deformed laterally to permit said plug to pass through said aperture and will automatically return to its normal position to fit snugly around the periphery of said cord after said plug has passed through said aperture.

References Cited by the Examiner

UNITED STATES PATENTS 2,619,515 11/1952 Doane _____ 339—94
2,934,591 4/1960 Tiikkainen _____ 174—67

PATRICK A. CLIFFORD, *Primary Examiner.*

J. H. McGLYNN, *Assistant Examiner.*